J. B. MARQUIS.
BAGGAGE CARRIER FOR AUTOMOBILES.
APPLICATION FILED DEC. 5, 1914.
1,156,539.
Patented Oct. 12, 1915.
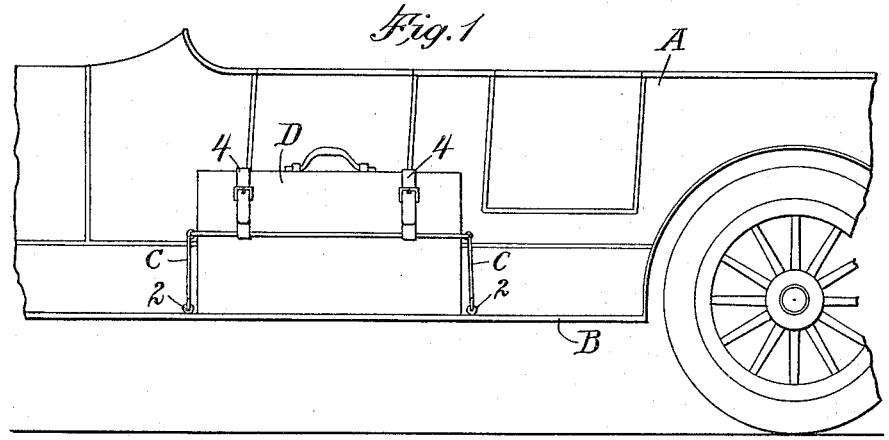
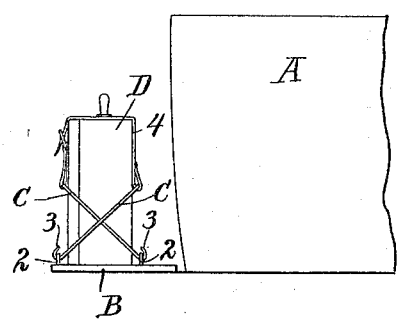
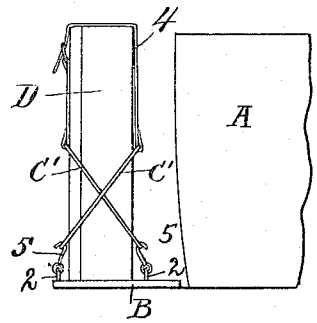
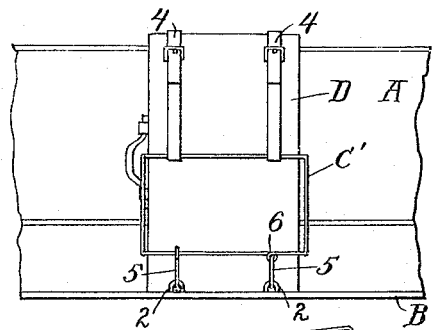
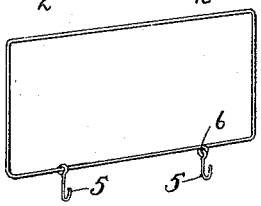
INVENTOR
James B. Marquis
BY
F. N. Gilbert
ATTORNEY
WITNESSES
E. G. Joyner
M. F. Terry

UNITED STATES PATENT OFFICE.

JAMES B. MARQUIS, OF NORWICH, NEW YORK.

BAGGAGE-CARRIER FOR AUTOMOBILES.

1,156,539.  Specification of Letters Patent.  Patented Oct. 12, 1915.

Application filed December 5, 1914. Serial No. 875,596.

*To all whom it may concern:*

Be it known that I, JAMES B. MARQUIS, a citizen of the United States, residing at Norwich, in the county of Chenango and State of New York, have invented certain new and useful Improvements in Baggage-Carriers for Automobiles, of which the following is a specification.

My invention relates to improvements in baggage carriers for automobiles in which on the tread board of an automobile removable bails are hinged to the tread board having straps mounted thereon capable of holding the baggage in firm position and it has for its object to provide a light, movable support for firmly holding suit cases or other forms of packages upon the tread board of automobiles.

With these objects in view my invention consists in certain novel features of construction and arrangement of parts as will be hereinafter fully described and pointed out in the claims. Reference being had to the accompanying drawings in which—

Figure 1 is a side view of my device mounted on the tread board of an automobile containing baggage. Fig. 2 is an end view of my device. Fig. 3 is an end view of a modified form of my device mounted on the tread board of an automobile. Fig. 4 is a side view of a modified form of my device. Fig. 5 is a part of a modified form of my device.

The same reference characters denote like parts in each of the several figures of the drawings.

In carrying out my invention, I have an automobile body A having the usual foot or tread board B. In the upper face of the foot board B I have mounted four eyelets 2. 2. 2. 2.

To further carry out my invention I have the bails C. C, the arms of which project in hook formation at the points 3. 3 as shown in Fig. 2. Fastened to one of the bails C. C I have two or more buckle straps 4. 4.

In a modified form of my device I have two bail frames C'. C'. The one is slightly smaller than the other so as to enable the one to pass inside of the other and mounted in the eyelets 2. 2. 2. 2 I have the hooks 5. 5 and 5. 5. In the lower side of the bail frames C' and C' I have the eyelet formation 6.

In a modified form of my device I have the bail frames C' and C' having on the lower side the eyelet formation 6. Mounted on the bail frames C' and C' are the hooks 5. 5, the one hook sliding upon the bail frame; the other mounted in the eyelet 6.

In the operation of my device having placed the one bail frame C in a cross position within the opposite bail frame C as in Fig. 1 and Fig. 2, I hook the ends of the bail frames C and C into the eyelets 2. 2 and 2. 2. Within these cross frames I place a suit case D or other form of package. I then draw the straps 4. 4 up over the suit case or other package and buckle them to the opposite bail C on the opposite side of the suit case; and thus draw the bail frames firmly up against the side of the package holding it in firm position. Or the package D may be placed on end, as shown in Fig. 3, and the straps 4. 4 drawn over the package and buckled to the opposite bail as before.

In the modified form of my device I cross the bail frames C' and C', the one within the other, and hook the hooks 5. 5 and 5. 5 mounted thereon within the eyelets 2. 2 and having placed the suit case or package D within the open or cross bail frames C'. C' I draw over the straps 4. 4 as before mounted on the one frame and buckle them to the opposite frame in the ordinary manner and draw the bail frames thus up against the side of the package and in this manner the suit case or other package is held in firm position upon the tread board of the automobile.

When I wish to remove the package I unbuckle the straps, open the bail frames, remove the package, release the bail frames from the eyelets in the one form and the hooks from the eyelets in the other form and place the bail frames within the body of the automobile for future use.

Having thus described my invention, what I claim as new, and for which I desire Letters Patent is as follows:—

1. A baggage carrier for automobiles having in combination two pairs of eyelets secured to the running board of the automobile, a pair of bails so spaced apart as to receive an article of baggage between them, hooked connections between the bails and the eyelets, and buckle straps connecting the two bails and passing over the article of baggage between the bails.

2. A baggage carrier for automobiles having in combination two pairs of eyelets secured to the running board of the automobile, a pair of crossed bails mounted in the eyelets and adapted to receive an article of baggage between them, and buckle straps connecting the two bails and passing over the article of baggage between the bails.

3. A baggage carrier for automobiles having in combination two pairs of eyelets secured to a suitable support, a pair of crossed bails swingingly mounted in the eyelets and adapted to receive between them an article of baggage one of the bails being slightly smaller than the other so as to project therethrough, and straps connecting the two bails and passing over the article of baggage.

In testimony whereof I have affixed my signature in presence of two witnesses.

JAMES B. MARQUIS.

Witnesses:
E. A. JOYNER,
J. D. SCOTT.